United States Patent [19]
Matsubara et al.

[11] Patent Number: 5,543,880
[45] Date of Patent: Aug. 6, 1996

[54] FRICTION MEMBER FOR BRAKE MECHANISM IN CAMERA SHUTTER

[75] Inventors: Takashi Matsubara; Masanori Hasuda, both of Yokohama; Masayuki Kanamuro, Kawasaki, all of Japan

[73] Assignee: Nikon Corporation, Tokyo, Japan

[21] Appl. No.: 458,754

[22] Filed: Jun. 2, 1995

[30] Foreign Application Priority Data

Jun. 7, 1994 [JP] Japan .................................. 6-125203
Feb. 17, 1995 [JP] Japan .................................. 7-029848

[51] Int. Cl.$^6$ .................................................. G03B 9/08
[52] U.S. Cl. .................................................. 354/252
[58] Field of Search .................................... 354/252

[56] References Cited

U.S. PATENT DOCUMENTS

| | | | |
|---|---|---|---|
| 3,967,293 | 6/1976 | Vincent | 354/252 |
| 4,316,662 | 2/1982 | Tosaka et al. | 354/241 |
| 4,847,649 | 7/1989 | Toyoda et al. | 354/252 |
| 4,975,722 | 12/1990 | Suzuki et al. | 354/246 |
| 5,475,459 | 12/1995 | Matsubara et al. | 354/246 |

Primary Examiner—Michael L. Gellner
Assistant Examiner—Daniel Chapik
Attorney, Agent, or Firm—Shapiro and Shapiro

[57] ABSTRACT

A friction member for a brake mechanism in a camera shutter is comprised of a layer-laminated body which is formed by laminating a plurality of resin layers each reinforced with carbon fibers aligned one-directionally in such a manner that the directions of the carbon fibers are crossing, for generating a frictional force to brake a member to be braked by coming in contact with the member to be braked. The thickness of the layer-laminated body is 50 μm to 200 μm, and the surface resin layer of the layer-laminated body contains 35 to 75 wt % of the carbon fiber.

7 Claims, 6 Drawing Sheets

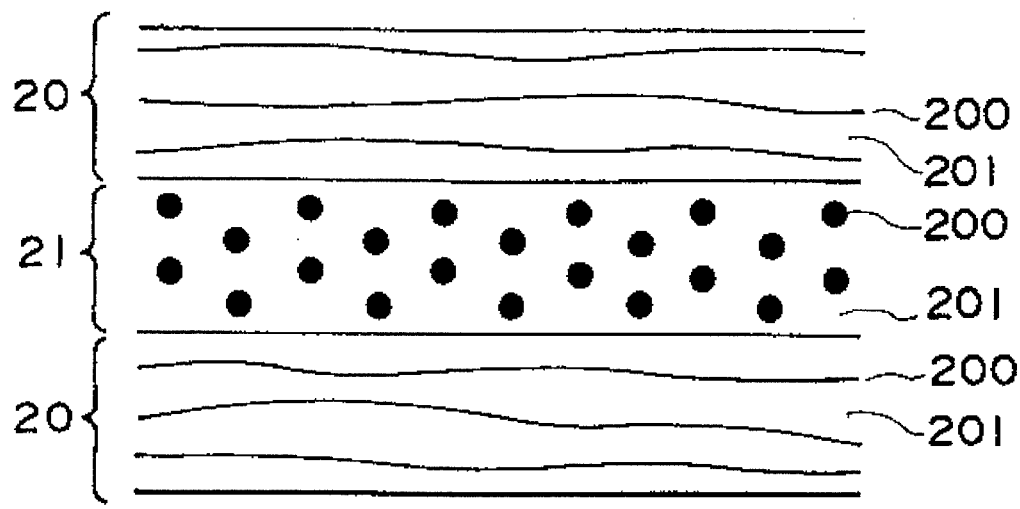
F I G. 1
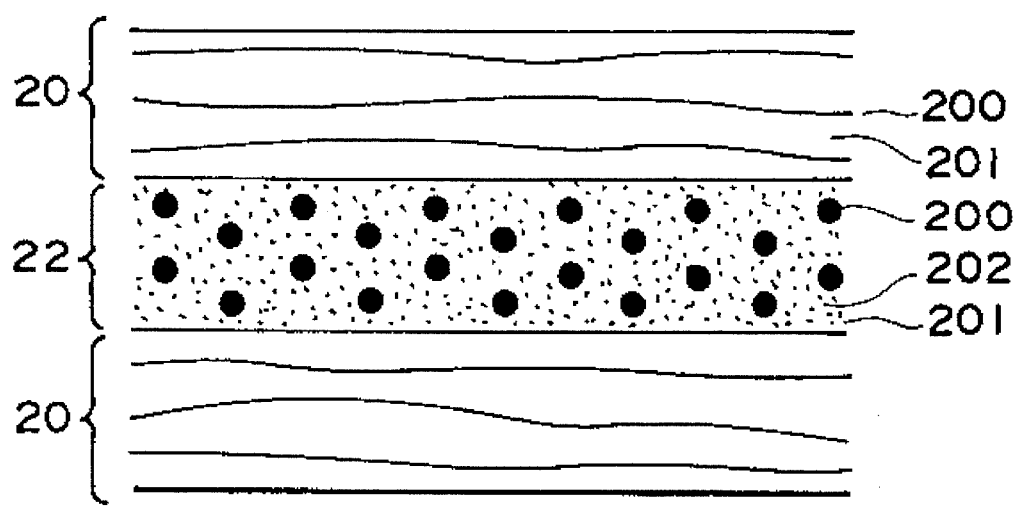
F I G. 2

FRICTION MEMBER FOR BRAKE MECHANISM IN CAMERA SHUTTER

BACKGROUND OF THE INVENTION

1. Field of the Invention

The present invention relates to a friction member used in a brake mechanism for a camera shutter such as a focal plane shutter or lens shutter of a camera.

2. Related Background Art

Recently, with an increased demand for an image of higher definition, new video expression, etc., and with the improvement in film sensitivity, it was required to make a shutter speed of a camera higher. In response to this, there has been provided a camera in which a high shutter speed of, for example, 1/8000 sec. and high durability have been attained.

In order to attain such higher shutter speed, it is important not only to make materials for a blade or an arm lightweight, but also to improve the brake performance of a brake mechanism for attenuating an impact when the shutter is halted.

FIGS. 4 and 5 show an example of a driving mechanism of a focal plane shutter in a camera.

In this example, a fore blade interlocking lever 2 and a hind blade interlocking lever 3 disposed on a base plate 1 are driven clockwise around shafts 2a and 3a against springs 4 and 5 with a time lag therebetween. Then, the engagement between a fore and hind blade driving levers 6 and 7 and the blade interlocking levers 2 and 3 are subsequently released so that the fore and hind blade driving levers 6 and 7 are rotated around the shafts 6a and 7a by the force of the springs 8 and 9.

Thus, four shutter blades 12a to 12d (which constitute a first blind or leading shutter curtain 12) connected to the fore blade driving lever 6 and another four shutter blades 13a to 13d (which constitute a second blind or trailing shutter curtain 13) connected to the hind blade driving lever 7 are driven with a predetermined time lag so as to adjust an amount of light passing through an aperture 1a.

As shown in FIG. 6, when the fore blade driving lever is rotated clockwise to reach the end of its moving path, the fore blade driving lever 6 abuts against a brake lever 14 to be subjected to the brake action.

The brake lever 14 eventually abuts against a buffer member 15a so as to stop the fore blade driving lever 6. The hind blade system is operated in the same manner. After the hind blade driving lever 7 abuts against a brake lever 16, the brake lever 16 abuts against a buffer member 15b so as to stop the hind blade driving lever 7.

The torques of the brake levers 14 and 16 are adjusted, for example, by a mechanism which is shown in FIG. 7. In FIG. 7, on a support shaft 17 which supports the brake levers 14 and 16 on the base plate 1, a pair of washers 18 are loaded in such a manner that the brake levers 14 and 16 are sandwiched therebetween. Thus, the washers 18 are urged against the brake levers 14 and 16 by a Belleville spring 19.

When the brake levers 14 and 16 are rotated, a frictional force is generated between the washers 18 and the brake levers 14 and 16 by the urging force of the Belleville spring 19. The rotating energy of the fore and hind blade driving levers 6 and 7 is absorbed by this frictional force.

In the example of FIG. 7, since the brake force varies in accordance with a thickness of the washers 18, one set of washers having proper thickness out of those having several kinds of thickness prepared in advance is selected when the shutter is assembled so as to adjust the brake force to be a predetermined one.

As material for the washers 18, PET (polyethylene terephthalate) is solely used. On friction surfaces between the washers 18 and the brake levers 14 and 16, a small amount of lubricating oil is dropped with the object of improving the abrasion-resistant performance of the friction surfaces and to adjust the frictional force (i.e., brake force).

That is, different from an ordinary brake, the brake levers constitute such mechanism as to mitigate the impact which is generated when the fore or hind blade is stopped, by rotating for a predetermined distance (stroke) while receiving an appropriate brake force.

More specifically, when the brake force is too strong, the brake levers 14 and 16 are not rotated by a predetermined angle so that the impact given to either of the blades becomes large, which leads to a damage or the like of the blade. On the contrary, when the brake force is too week, it loses its function of stopping the brake levers 14 and 16 as a brake. Therefore, it is required to adjust the brake force within a delicate range.

As a result, the lubricant is required in order to adjust the brake force within the delicate range.

Recently, there is increased demand for a super-high speed shutter which has a speed exceeding 1/8000 sec. In order to attain this, it is required to make materials for blades or arms of the shutter to be lightweight and the shutter curtain speed to be more higher.

However, with acceleration of the shutter curtain speed, the impact generated when a shutter blade is stopped becomes larger. Therefore, a brake having a larger absorption energy than a conventional one is required. When the conventional blade material is used as it is, a creak may be generated from the stage on which the shutter has not been used much, or the brake force may be changed or other inconvenient phenomenon may occur. Thus, the initial brake performance may not be maintained, or the lightweight blade or arm may be damaged on an early stage, or the durability may be extremely deteriorated.

SUMMARY OF THE INVENTION

An object of the present invention is to provide a friction member for a brake mechanism in a camera shutter which can generate a stable brake force even when an operation speed of a member to be braked is accelerated.

The present inventors presumed that the above-mentioned change of the brake force is caused by a decrease in the thickness or a change in the surface condition of a friction member (for example, a washer), or a change in an amount of lubricant (for example, lubricating oil) retained on the surface or the like of the friction member, and examined thickness and arrangements of various kinds of materials and members to obtain such friction member which can avoid these changes, thereby making the present invention.

The present invention provides a friction member for a brake mechanism in a camera shutter comprised of a layer-laminated body which is formed by laminating a plurality of resin layers each reinforced with carbon fibers aligned one-directionally in such a manner that the directions of said carbon fibers are crossing, for generating a frictional force to brake a member to be braked by coming in contact with said member to be braked, characterized in that the thickness of said layer-laminated body is 50 μm to 200 μm, the surface resin layer of said layer-laminated body contains 35 to 75 wt % of the carbon fiber, and the lubricant is retained at least on the surface of said layer-laminated body.

According to the present invention, since the resin layers which are reinforced with the carbon fibers having high abrasion-resistance are laminated to form the friction member (layer-laminated body), a change in the brake force caused by a change in the thickness or a change in the surface condition of the friction member can be suppressed and the stable brake force can be obtained.

Also, since the directions of the carbon fibers of the resin layers of the layer-laminated body are crossing to each other, a crack on the friction member in a fiber direction can be prevented and a necessary intensity against the surface load to be received as a friction member can be ensured almost in any direction.

Particularly, when the resin layers are crossing plane-symmetrically with respect to the central plane in the direction of the thickness and are laminated, unevenness in the thickness and deterioration of the flatness of the friction member (layer-laminated body) can be desirably suppressed, compared with the case in which the resin layers are not crossing to be laminated.

Also, when an amount of the carbon fiber contained in the resin layers is 35 to 75 wt % (preferably 45 to 65 wt %), plastic deformation of the resin layers can be suppressed to a very small amount.

Further, when the thickness of the layer-laminated body which constitutes the friction member is 50 to 200 μm and the lubricant is retained at least on the surface layer of the layer-laminated body, if at least the surface resin layer out of the plurality of resin layers contains the above-mentioned amount of the carbon fiber, the abrasion-resistance of the friction member is improved and a change in the surface condition of said member can be suppressed. Thus, the lubricant retaining effect can be excellent for a longer period. As a result, a change in the thickness of the whole friction member is suppressed so that the brake force can be stabilized for a long term.

If the brake is constituted by a friction member which can not retain lubricant (for example, grease) at least on the surface of the layer-laminated body, a creak is generated and the brake force becomes unstable.

In addition, if the layer-laminated body contains too much amount of carbon fibers, carbon fiber retaining performance of the resin is decreased and the intensity of the resin may become unsatisfactorily insufficient.

The present invention will be described below more specifically by way of embodiments with reference to the drawings. However, the present invention is not limited to these embodiments.

BRIEF DESCRIPTION OF THE DRAWINGS

FIG. 1 is a cross-sectional view of a washer (one example of the friction member for a brake mechanism) according to an embodiment of the present invention;

FIG. 2 is a cross-sectional view of a washer (one example of the friction member for the brake mechanism) according to another embodiment of the present invention;

DETAILED DESCRIPTION OF PREFERRED EMBODIMENTS

First Embodiment

Figure 3:
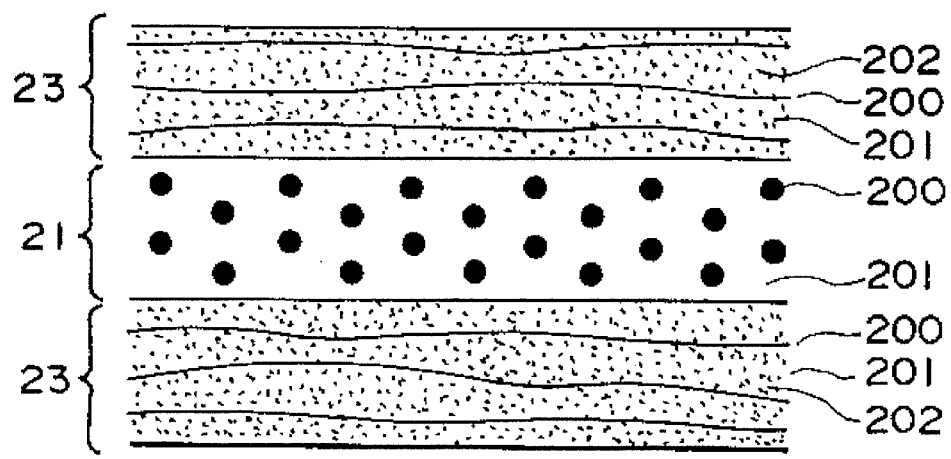
FIG. 3 is a cross-sectional view of the washer of FIG. 2 in a modified example.
Figure 4:
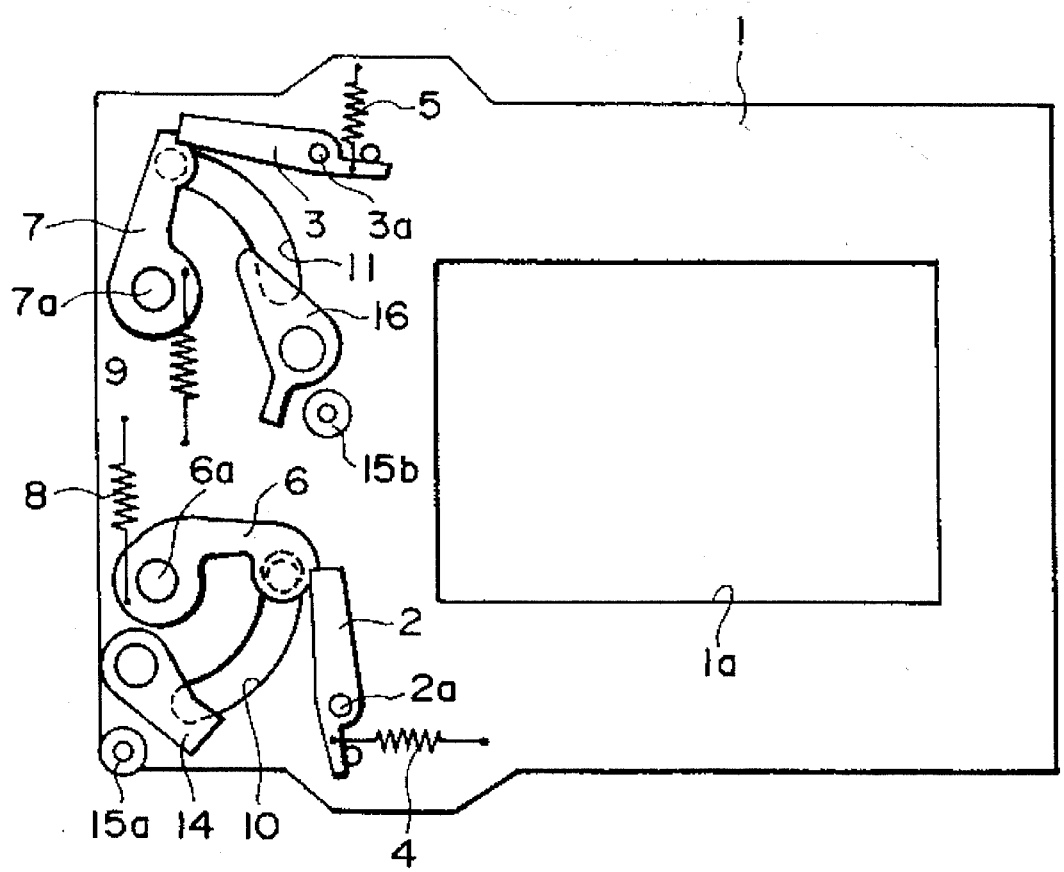
FIG. 4 is a view showing a focal plane shutter mechanism of a camera.
Figure 5:
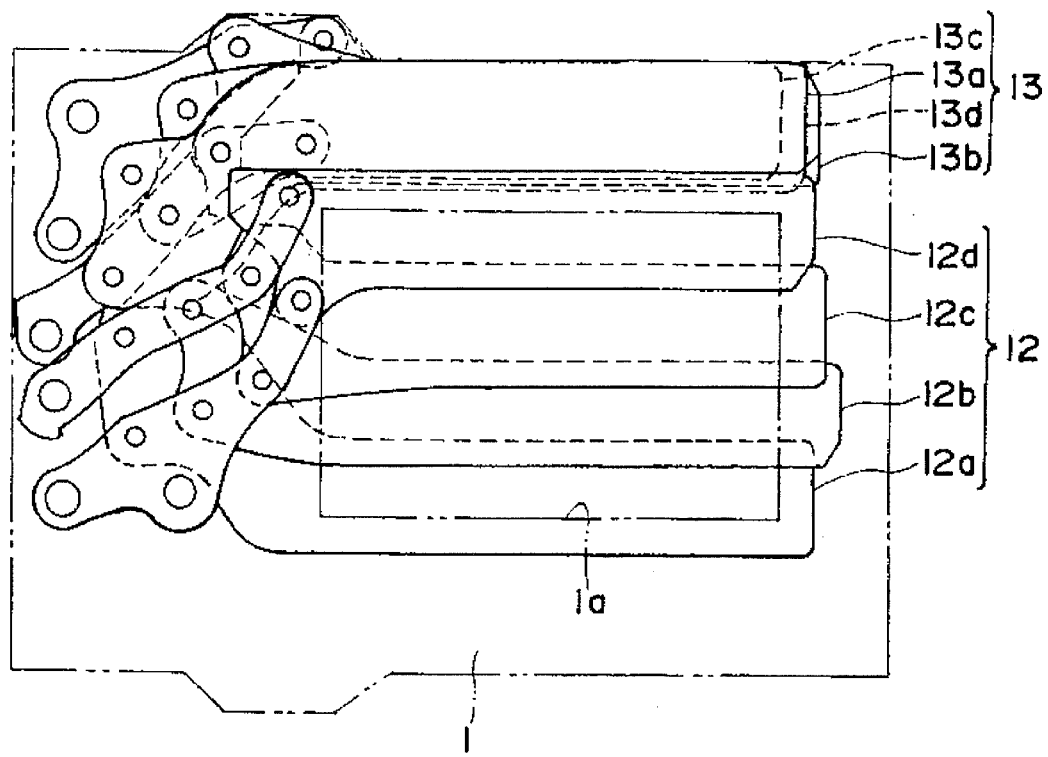
FIG. 5 is a view showing the relationship between an aperture and a shutter blade in the focal plane shutter mechanism of FIG. 4.
Figure 6:
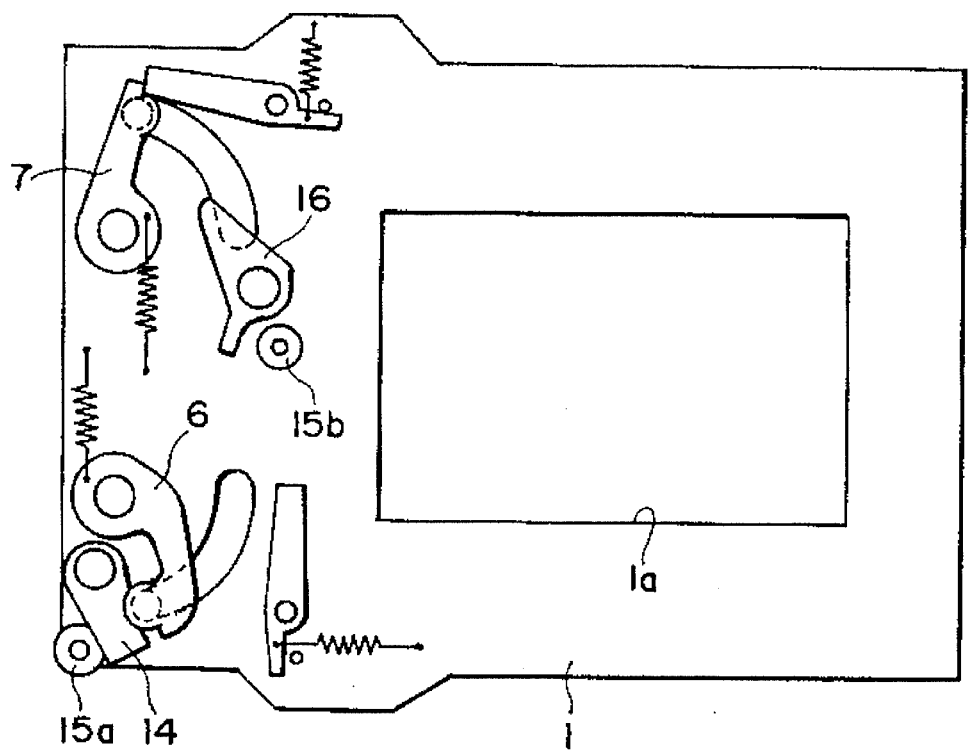
FIG. 6 is a view showing a state in which the first blind or leading shutter curtain is operated in the focal plane shutter mechanism of FIG. 4.

First, three prepreg sheets each containing 35 to 75 wt % of carbon fibers and having the thickness of 20 to 40 μm are prepared. In the prepreg sheet, the carbon fiber (having the diameter of 6 to 7 μm on the average) is continuous fibers aligned in one direction, and the matrix resin is made of epoxy resin.

These sheets were laminated plane-symmetrically with respect to the central plane of the direction of lamination in such a manner that directions of the fibers of the respective sheets were crossing at right angles. After being pinched by releasing films, the pressure of 5 to 15 kgf/cm² was applied to the laminated prepreg sheets at a temperature of 130° C., and the prepreg sheets were left in that state for 1 to 2 hours to cure the epoxy resin. After that, the sheets were cooled to a room temperature to obtain a blank of 60 to 120 μm thickness.

A washer for braking a focal plane shutter was produced from the blank thus obtained by the press blanking.

The washer obtained in the above-mentioned process has a three-layered structure which is comprised of a pair of surface layers 20 and a single intermediate layer 21 corresponding to the three prepreg sheets, as shown in FIG. 1.

The carbon fibers 200 contained in the respective layers 20 and 21 are crossing at right angles in accordance with the direction of the prepreg sheets at the time of the lamination. With the cure of the matrix resin 201 of the prepreg sheets by heating, the layers 20 and 21 are connected to each other tightly.

Second Embodiment

A prepreg sheet having the thickness of 10 to 50 μm was prepared. In the prepared sheet, the carbon fibers (having the diameter of 6 to 7 μm on the average) was a short fiber having the length of 1 to 30 mm aligned in one direction, and the matrix resin was made of epoxy resin.

This short fiber prepreg sheet was used as an intermediate layer and the two prepreg sheets prepared in the first embodiment were used as surface layers. These prepreg sheets were laminated plane-symmetrically with respect to the central plane of the direction of lamination in such a manner that directions of the fibers of these prepreg sheets were crossing at right angles. Thus, a blank having the thickness of 50 to 130 μm was produced by the method of the first embodiment so as to produce a washer. The cross section of the produced washer is the same as FIG. 1.

Third Embodiment

There were prepared one prepreg sheet which was obtained by adding 10 wt % of carbon black having the average particle diameter of 0.7 μm or less to every 100 wt % of the resin of a prepreg sheet having the same structure as that used in the first embodiment, and two prepreg sheets which are the same as produced in the first embodiment. The prepreg sheets were laminated in the same manner as in the first embodiment except that the prepreg sheet added with the carbon black here became the intermediate layer of a washer.

The laminated prepreg sheets were pinched by the releasing films which are the same as in the first embodiment and a washer was produced in the same manner as in the first embodiment. The produced washer is of a three-layered structure comprised of a pair of surface layers 20 in which direction of carbon fibers 200 are crossing at right angles and a single intermediate layer 22, as shown in FIG. 2. The present embodiment is different from that of FIG. 1 only in that the intermediate layer 22 contains the carbon black 202.

Note that, two prepreg sheets added with the carbon black may be prepared, as shown in FIG. 3, to be used as surface layers, and the surface layers 23 containing the carbon black 202 and an intermediate layer 21 which has no carbon black, but reinforced by the carbon fibers 200 aligned in one direction, may constitute a washer. The carbon black 202 may be contained both in the surface layers and the intermediate layer.

Fourth Embodiment

There were prepared two prepreg sheets which were obtained by adding 10 wt % of carbon black having the average particle diameter of 0.7 μm or less to every 100 wt % of the resin of a prepreg sheet having the same structure as that used in the first embodiment and the short-fiber prepreg sheet produced in the second embodiment. These prepreg sheets were laminated in the same manner as in the second embodiment except that the prepreg sheets added with the carbon black became the surface layers of a washer.

The laminated prepreg sheets were pinched by the releasing films which are the same as in the first embodiment, and a washer was produced in the same manner as in the second embodiment. The cross section of the obtained washer is the same as that in FIG. 3.

Figure 7:
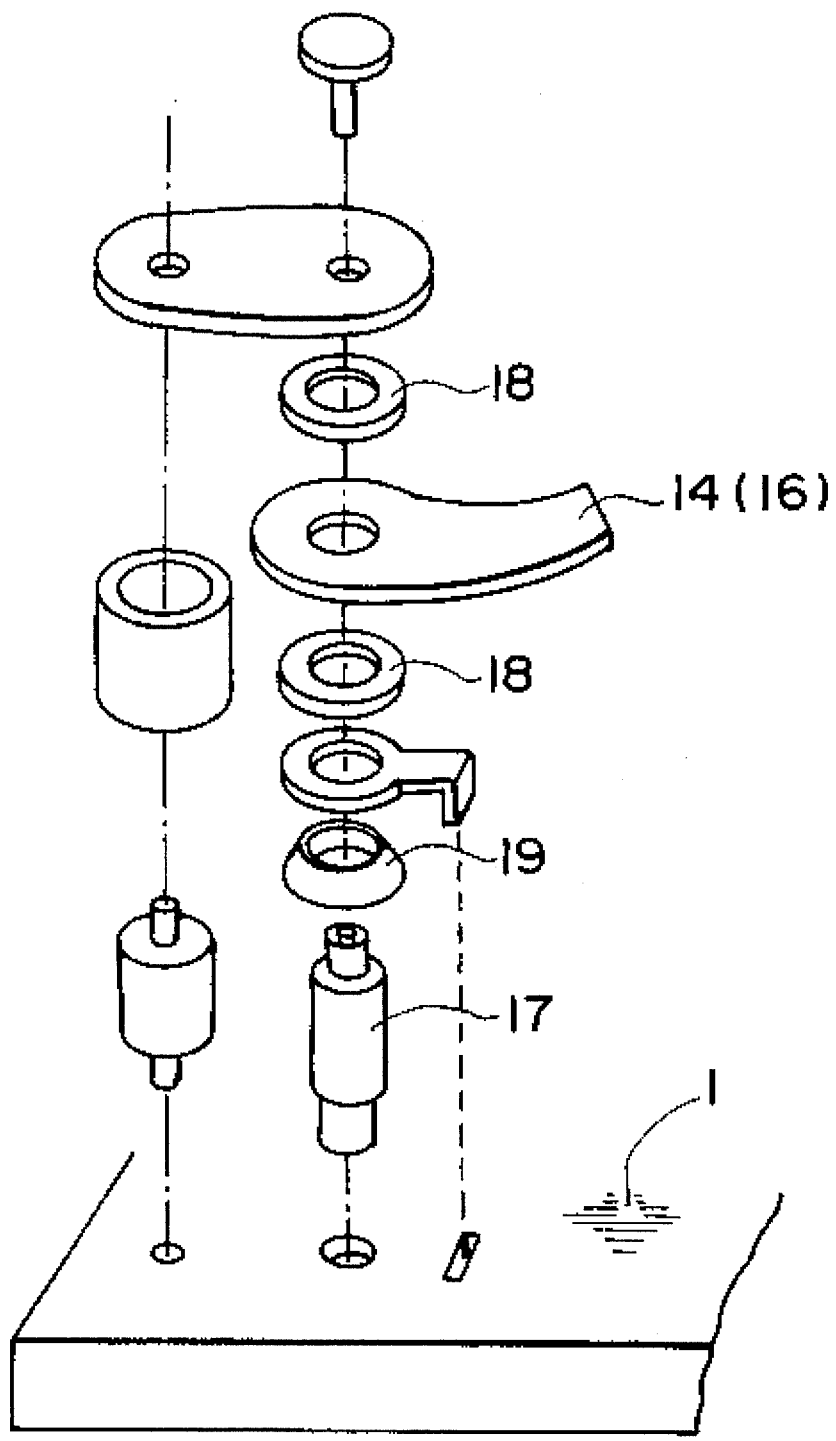
FIG. 7 is a perspective view showing a brake mechanism for the focal plane shutter of a camera.

Washers produced in any of the foregoing first to fourth embodiments are used as washers 18 in the brake mechanism of the focal plane shutter shown in FIG. 7 so as to assemble the illustrated brake mechanism. In this case, a small amount of grease-type lubricant (one example of the lubricant) was applied onto the entire frictional surface between the washers 18 and the brake levers 14 and 16 with a brush so as to preserve the lubricant at least on the surface of the washers comprised of the laminated layers. The lubricant to be used is the grease made of squalene and added with lithium soap. The consistency of this grease is about 300 at the temperature of 20° C. and 290 to 310 in a temperature range from −40° C. to +40° C.

The consistency is represented by a value which is obtained by placing a predetermined amount of the grease into a normal receptacle, dropping a conical measurer from the surface of the grease, measuring a sinking depth of the measurer at that time, and multiplying the depth by a constant. The measuring method is specified in the JIS (Japanese Industrial Standard) K2220.

Then, the shutter is repeatedly operated at two shutter curtain speeds, and the durability of the shutter blade, the shutter arm, or the like is tested. Results of the test are shown in Table 1. As a comparative example, test results on a washer which is made of PET (polyethylene terephthalate) as in the conventional manner are also shown in Table 1.

A shutter curtain speed in Table 1 indicates a time period from the start of opening of an aperture 1a by the leading curtain to the completion of the opening, or a time period from the start of closing of the aperture 1a by the trailing curtain to the completion of the closing. The shutter curtain speed 2.9 msec is the speed which enables the shutter speed of 1/8000 sec.

TABLE 1

| shutter curtain speed | First to fourth Embodiments | | Comparative example | |
|---|---|---|---|---|
| | 2.9 msec | 2.2 msec | 2.9 msec | 2.2 msec |
| Result of durability test | Normal after 150,000 times of operations | Normal after 150,000 times of operations | Normal after 150,000 times of operations | Abnormal after 5000 to 20,000 times of operations |

Figure 8:
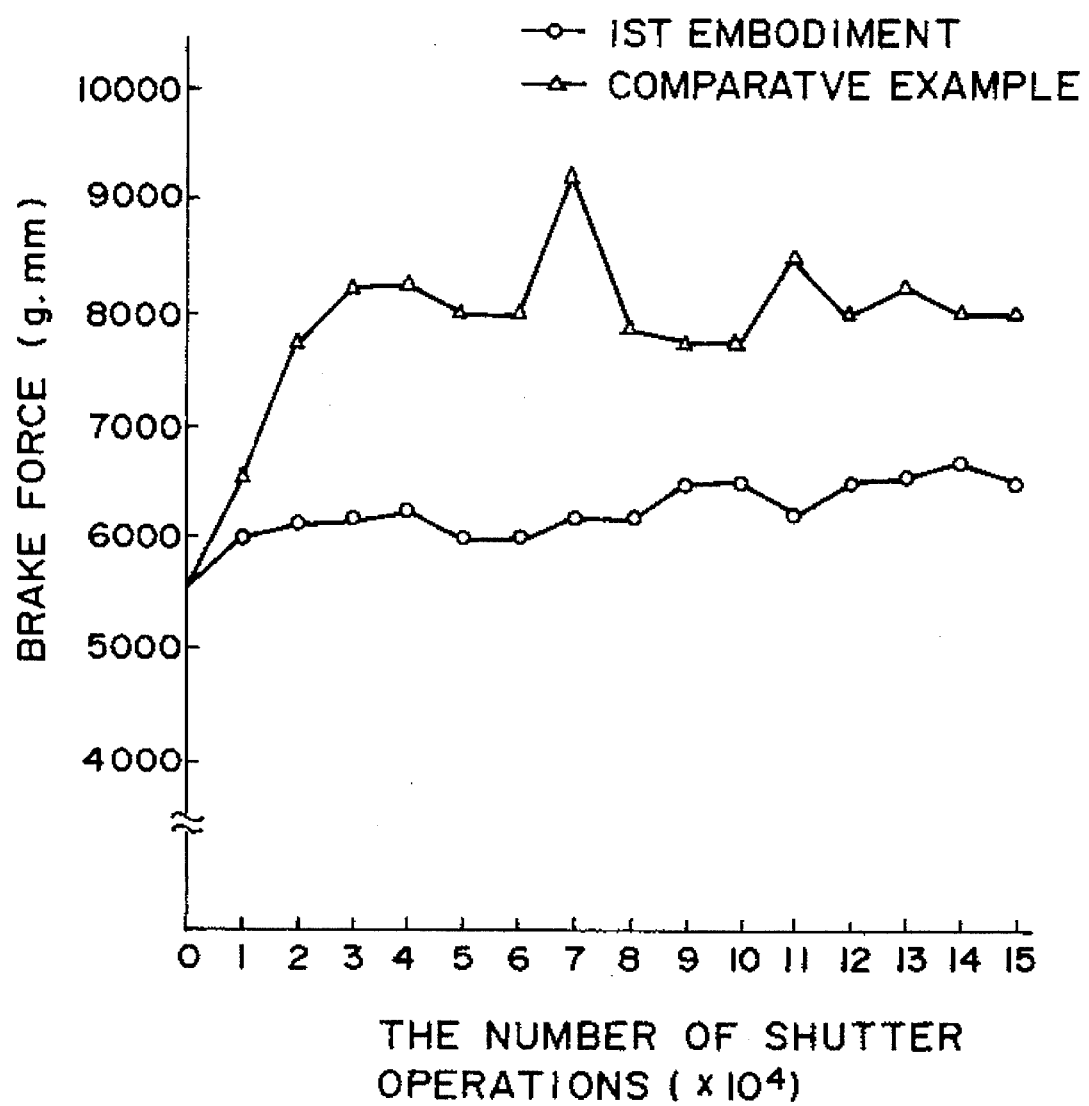
FIG. 8 is a view showing the relationship between the number of shutter operations and a change of the brake force.

Further, with respect to the embodiments and the comparative example, the relationship between the number of repeated shutter operations at the shutter curtain speed 2.2 msec and a change of the brake force was measured. The measurement was carried out by use of a torque meter. A result of the measurement is shown in FIG. 8. Note that in the comparative examples, even if abnormality occurred in a shutter blade, arm, or the like, the measurement was continued by replacing the shutter blade, arm or the like.

As clearly seen from the results shown above, it was confirmed that, when the washers in any of the embodiments were used, the shutter blade or the arm was not damaged and the brake force could be maintained constant even at a shutter curtain speed attaining a shutter speed exceeding 1/8000 sec. On the contrary, it was confirmed, in the comparative example, that there arose a conspicuous change of the brake force in the shutter curtain speed range in which a shutter speed exceeding 1/8000 sec. can be attained so that the durability of the shutter blade or the arm was largely decreased. Note that the consistency of lubricant to be used should be 400 or less, and preferably 300 or less, in order to increase the retaining performance. In addition to the grease used in the embodiments, tests were conducted, for example, on a grease which was made of poly-α-olefinic base oil and mainly added with lithium soap or fluoric resin such as PTFE (polytetrafluoroethylene), a grease which was made of perphloropolyether base oil added with fluoric resin, etc., a paste made of poly-α-olefinic base oil added with fluoric resin, etc., a paste made of mineral oil added with lithium soap, molybdenum disulfide, etc., and further a solid lubricant such as molybdenum disulfide, tungsten disulfide, graphite, etc., or dry film lubricant, or the like, which is a combination of any of these materials with organic or nonorganic binder. Results of the tests were the similar to those for the embodiments. These lubricants have the consistency in a range from 150 to 400 at a temperature range from −40° C. to +40° C. Particularly, the grease made of perphloropolyether added with fluoric resin has the consistency from 260 to 300, and is chemically stable and usable in a wide temperature range, which is desirable since a change of the brake force is made smaller therefor. Note that attention should be paid to a lubricant which is easily blotted since it is easily scattered to the blade or other parts during an operation of the shutter.

In the foregoing embodiments, the brake levers 14 and 16 in FIG. 7 are corresponding to the members to be braked, the washers 18 to the friction members, and the surface layers 20 and 23 and the intermediate layers 21 and 22 of the washer to the resin layers of the friction member (the layers constituting the layer-laminated body).

The layer-laminated body constituting the friction member 18 is usable as a shutter blade. However, it is not necessary in this case to retain lubricant on the surface of the layer-laminated body.

Figure 9:
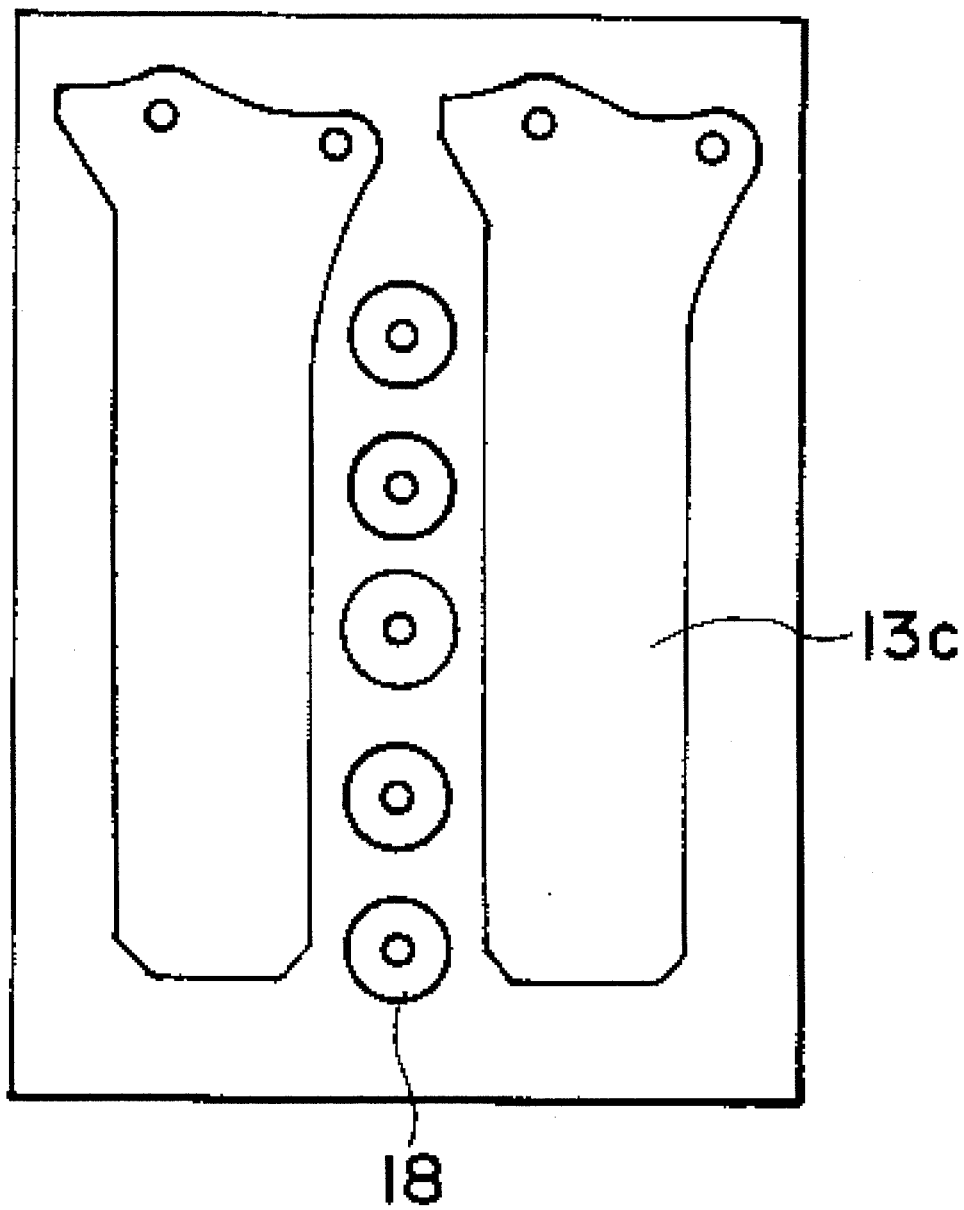
FIG. 9 is a schematic plane view showing a remaining portion of a blank serving as a friction member after a shutter blade was blanked out therefrom.

From a portion of the blank remaining after the blanking of the shutter blade (the remaining blank), the above-mentioned friction member 18 can be further blanked out. An example of this is shown in FIG. 9. In this example, the shutter blade 13c is the second blade of the second or trailing shutter curtain.

Since the above-mentioned remaining blank which was conventionally thrown away can be used for the friction member in this manner, it is no longer required to buy a friction member separately. The quality check on a friction member was conventionally conducted separately from that on a shutter blade. However, when the friction member is obtainable from the above-mentioned remaining blank, the quality check on the shutter blade also serves as that on the friction member, and it becomes possible to reduce the number of steps for the quality check, which leads to a substantially reduction in the cost.

In the embodiments, all of the prepreg sheets are laminated as a three-layered structure so as to form a washer. However, a friction member of the present invention is not limited to the three-layered structure one which is comprised of a pair of surface layers and a single intermediate layer, but may be comprised of four layers or more.

Directions of the carbon fibers of the resin layers may not always be crossing at right angles, but also may be crossing at angles less than 90°. The structure of the member may be a sandwich structure in which a plastic film or the like is sandwiched between prepreg sheets.

Further, the prepreg sheet of 20 to 40 μm used in the first embodiment, for example, are used to form a four-layered or five-layered structure so as to obtain a blank of 80 to 200 μm, which is also usable.

In order to improve lubricant retaining performance of lubricant, it is more preferable to finish the surface of the surface layer like sating. It is also preferable to prescribe that at least one resin layer out of the resin layers should contain 45 to 65 wt %.

The present invention was described above by using the brake mechanism in the focal plane shutter of a camera which has the first and second shutter curtains each comprised of four or five separated blades. However, the present invention can also be applied in the same manner to a brake mechanism which utilizes a frictional force of various kinds of operating mechanisms such as a blade mechanism of a lens shutter, a stop-down mechanism, or a main mirror mechanism.

Also, since the friction member of the present invention may have the same structure as that proposed as material for the shutter blade, the remaining portion of the blank after the blanking of the shutter blade can be used as the material for the friction member so as to easily produce the friction member.

As described above, the friction member is formed of the layer-laminated body in which resin layers reinforced with carbon fibers having excellent abrasion resistance, the thickness of said layer-laminated body is made to be 50 to 200 μm, the surface resin layer of said layer-laminated body is made to contain 35 to 75 wt % of the carbon fiber, and the lubricant is retained at least on the surface of said layer-laminated body, so that a change of the brake force due to a change in the thickness or in the surface condition of the friction member can be suppressed and the stable brake force can be obtained.

Since the directions of the carbon fibers of the resin layers are crossing to each other, a crack on the friction member in the fiber direction can be prevented and, at the same time, a necessary intensity against the plane load received as the friction member can be ensured in almost any direction. Especially, since the resin layers are crossing to be laminated plane-symmetrically with respect to the central plane in the direction of thickness, an unevenness in the thickness or a deterioration of the flatness of the friction member can be suppressed so that a friction member of stable quality can be obtained in mass production.

What is claimed is:

1. A friction member for a brake mechanism in a camera shutter comprised of a layer-laminated body which is formed by laminating a plurality of resin layers each reinforced with carbon fibers aligned one-directionally in such a manner that the directions of said carbon fibers are crossing, for generating a frictional force to brake a member to be braked by coming in contact with said member to be braked, characterized in that:

the thickness of said layer-laminated body is 50 μm to 200 μm, and a surface resin layer of said layer-laminated body contains 35 to 75 wt % of the carbon fiber.

2. A friction member according to claim 1, wherein lubricant is preserved at least on the surface of said layer-laminated body.

3. A friction member according to claim 2, wherein the layer-laminated body has a three-layered structure, epoxy resin is used as matrix resin in each layer, and the carbon fiber is made of continuous fibers.

4. A friction member according to claim 2, wherein the layer-laminated body has a three-layered structure each layer of which has epoxy resin used as matrix resin, and is comprised of a pair of surface resin layers with the carbon fiber made of continuous fibers and an intermediate layer with the carbon fiber made of short fiber.

5. A friction member according to claim 2, wherein the layer-laminated body has a three-layered structure each layer of which has epoxy resin used as matrix resin, and is comprised of a pair of surface resin layers with the carbon fiber made of continuous fibers and an intermediate layer added with carbon black.

6. A friction member according to claim 2, wherein the layer-laminated body has a three-layered structure each layer of which has epoxy resin as matrix resin, and is comprised of a pair of surface resin layers added with black carbon.

7. A friction member according to claim 2, wherein the lubricant is of grease type having the consistency of 400 or less.

* * * * *